United States Patent
Kozaki

(10) Patent No.: US 10,711,909 B2
(45) Date of Patent: Jul. 14, 2020

(54) TARGET OPENING DEGREE ESTIMATOR AND PRESSURE ADJUSTMENT VACUUM VALVE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 63 days.

(21) Appl. No.: 16/251,178

(22) Filed: Jan. 18, 2019

(65) Prior Publication Data

US 2019/0293201 A1  Sep. 26, 2019

(30) Foreign Application Priority Data

Mar. 20, 2018  (JP) ................. 2018-052100

(51) Int. Cl.
*F16K 31/04* (2006.01)
*F16K 51/02* (2006.01)
*G05D 16/20* (2006.01)
*G05D 16/16* (2006.01)
*F16K 3/04* (2006.01)
*F16K 37/00* (2006.01)
*G05D 16/00* (2006.01)
*F16K 3/06* (2006.01)

(52) U.S. Cl.
CPC .............. *F16K 31/046* (2013.01); *F16K 3/04* (2013.01); *F16K 3/06* (2013.01); *F16K 37/0075* (2013.01); *F16K 37/0083* (2013.01); *F16K 37/0091* (2013.01); *F16K 51/02* (2013.01); *G05D 16/024* (2019.01); *G05D 16/163* (2013.01); *G05D 16/202* (2013.01); *G05D 16/208* (2013.01)

(58) Field of Classification Search
CPC .......... F16K 31/046; F16K 51/02; F16K 3/04; F16K 37/0075; F16K 37/0083; F16K 37/0091; F16K 3/06; G05D 16/208; G05D 16/163; G05D 16/024; G05D 16/202
USPC ..................... 251/129.04, 300–302
See application file for complete search history.

(56) References Cited

U.S. PATENT DOCUMENTS

| | | | | |
|---|---|---|---|---|
| 5,803,107 | A * | 9/1998 | Kaveh .................. | G05D 16/202 137/14 |
| 6,142,163 | A * | 11/2000 | McMillin ........... | G05D 16/2013 137/14 |
| 2010/0252121 | A1* | 10/2010 | Saito .................. | G05D 16/2013 137/14 |
| 2015/0057816 | A1* | 2/2015 | Schick ................. | G05D 7/0635 700/282 |
| 2016/0077531 | A1* | 3/2016 | Kucera ................ | G05D 7/0647 137/2 |

(Continued)

FOREIGN PATENT DOCUMENTS

JP 2014-207353 A 10/2014

*Primary Examiner* — John Bastianelli
(74) *Attorney, Agent, or Firm* — Renner, Otto, Boisselle & Sklar, LLP

(57) ABSTRACT

A target opening degree estimator estimates a target opening degree estimation value as an opening degree of a valve element of a pressure adjustment vacuum valve when a pressure of a vacuum chamber connected to the pressure adjustment vacuum valve reaches a pressure adjustment target pressure based on a correlation between the opening degree of the valve element and the pressure of the vacuum chamber, a current opening degree, and a current pressure.

6 Claims, 6 Drawing Sheets

(56) References Cited

U.S. PATENT DOCUMENTS

2016/0252158 A1* 9/2016 Jones .................... H02K 7/025
74/572.1
2017/0328756 A1* 11/2017 Chamberlain ....... G01N 17/008

* cited by examiner

TARGET OPENING DEGREE ESTIMATOR AND PRESSURE ADJUSTMENT VACUUM VALVE

BACKGROUND OF THE INVENTION

1. Technical Field

The present invention relates to a target opening degree estimator and a pressure adjustment vacuum valve.

2. Background Art

In a vacuum processing device such as a CVD device, process gas is, in many cases, supplied into a process chamber while a process is being performed with a chamber internal pressure being maintained at a predetermined pressure. Normally, there are multiple steps under different process conditions, and processing advances while the conditions at each step are switched in every predetermined time. At this point, for ensuring process uniformity, it is necessary that a pressure promptly converges to a subsequent predetermined pressure value at switching timing between the steps and pressure fluctuation is reduced as much as possible within each step interval.

Thus, a pressure adjustment vacuum valve (also called an APC valve) is provided between the process chamber and a vacuum pump, and driving of a valve element of the pressure adjustment vacuum valve is controlled by a motor such that the pressure of the process chamber is controlled to a desired pressure (see, e.g., Patent Literature 1 (JP-A-2014-207353)).

In the case of exhaust from the process chamber by means of a vacuum pumping device including the vacuum pump and an automatic pressure adjustment valve, exhaust characteristic data on the vacuum pumping device is stored in advance in a controller of the pressure adjustment vacuum valve, and pressure adjustment operation is performed by the automatic pressure adjustment valve based on the exhaust characteristic data. For example, in the case of using feedforward control for pressure adjustment, a target opening degree as a transition destination is set based on the exhaust characteristic data, and the valve element is driven.

However, when the accuracy of the target opening degree is low, there are problems in stability in pressure adjustment response, such as a fluctuating pressure value.

SUMMARY OF THE INVENTION

A target opening degree estimator estimates a target opening degree estimation value as an opening degree of a valve element of a pressure adjustment vacuum valve when a pressure of a vacuum chamber connected to the pressure adjustment vacuum valve reaches a pressure adjustment target pressure based on a correlation between the opening degree of the valve element and the pressure of the vacuum chamber, a current opening degree, and a current pressure.

The correlation is a correlation showing a pressure response characteristic in association with an opening degree change.

The correlation is an amount represented by an expression of $|(\Delta P/\Delta\theta)|/P$ where the pressure of the vacuum chamber is P, a change in the pressure of the vacuum chamber is $\Delta P$, and a change in the opening degree of the valve element is $\Delta\theta$.

The target opening degree estimation value is estimated in such a manner that addition of an opening degree increment is repeated until a pressure calculated based on a post-addition opening degree obtained by addition of the opening degree increment to the current opening degree and the correlation reaches equal to or higher than the pressure adjustment target pressure, and a first opening degree increment is used as the opening degree increment in a case where a pre-addition opening degree is lower than a predetermined opening degree, and a second opening degree increment greater than the first opening degree increment is used as the opening degree increment in a case where the pre-addition opening degree is equal to or higher than the predetermined opening degree.

A pressure adjustment vacuum valve comprises: a valve element to be openably driven; the target opening degree estimator; and an opening degree control section configured to control the opening degree of the valve element based on a target opening degree estimation value estimated by the target opening degree estimator.

The opening degree control section outputs, from start of pressure adjustment by valve element driving, a feedforward opening degree from the current opening degree to the target opening degree estimation value, thereby performing feedforward control for the opening degree of the valve element.

The opening degree control section performs feedback control in addition to the feedforward control, and in the feedback control, a feedback opening degree with a value of zero is output until the feedforward opening degree reaches the target opening degree estimation value, and when the feedforward opening degree reaches the target opening degree estimation value, a feedback opening degree corresponding to a deviation of the pressure of the vacuum chamber with respect to the pressure adjustment target pressure is output.

The opening degree control section outputs a feedforward opening degree from the current opening degree to an opening degree higher than the target opening degree estimation value in a case where the pressure adjustment target pressure is lower than the pressure of the vacuum chamber, and outputs a feedforward opening degree from the current opening degree to an opening degree lower than the target opening degree estimation value in a case where the pressure adjustment target pressure is higher than the pressure of the vacuum chamber.

A target opening degree estimation value can be calculated with favorable accuracy, and stability in pressure adjustment response can be improved.

DETAILED DESCRIPTION OF THE EXEMPLARY EMBODIMENTS

Figure 1:
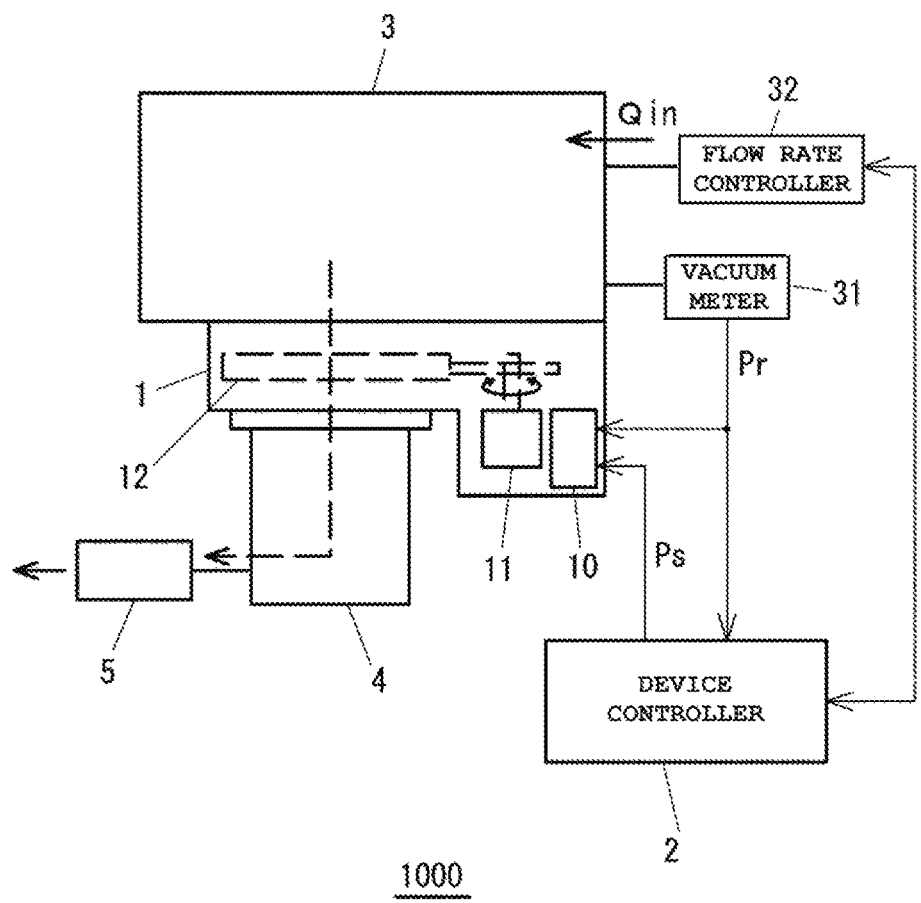
FIG. 1 is a schematic view of a device including a pressure adjustment vacuum valve of the present invention.

Hereinafter, a mode for carrying out the present invention will be described with reference to the drawings. FIG. 1 is a schematic view of a device including a pressure adjustment vacuum valve of the present invention. The device illustrated in FIG. 1 is a vacuum process device 1000 such as a CVD device. Such a device includes a vacuum chamber 3 attached to a vacuum pump 4 via a pressure adjustment vacuum valve 1, and a device controller 2.

The vacuum pump 4 is a turbo-molecular pump, and a roughing vacuum pump 5 is connected to an exhaust side of the vacuum pump 4. The vacuum chamber 3 includes a vacuum meter 31 configured to measure a chamber internal pressure, and a flow rate controller 32 configured to control the flow rate Qin of gas injected into the vacuum chamber 3. The pressure adjustment vacuum valve 1 includes a valve element 12, a motor 11 configured to openably drive the valve element 12, and a valve control section 10 configured to control operation of the pressure adjustment vacuum valve 1. A pressure measurement value Pr measured by the vacuum meter 31 is input to the device controller 2 and the valve control section 10 of the pressure adjustment vacuum valve 1. A target pressure value Ps is input from the device controller 2 to the valve control section 10.

Figure 2:
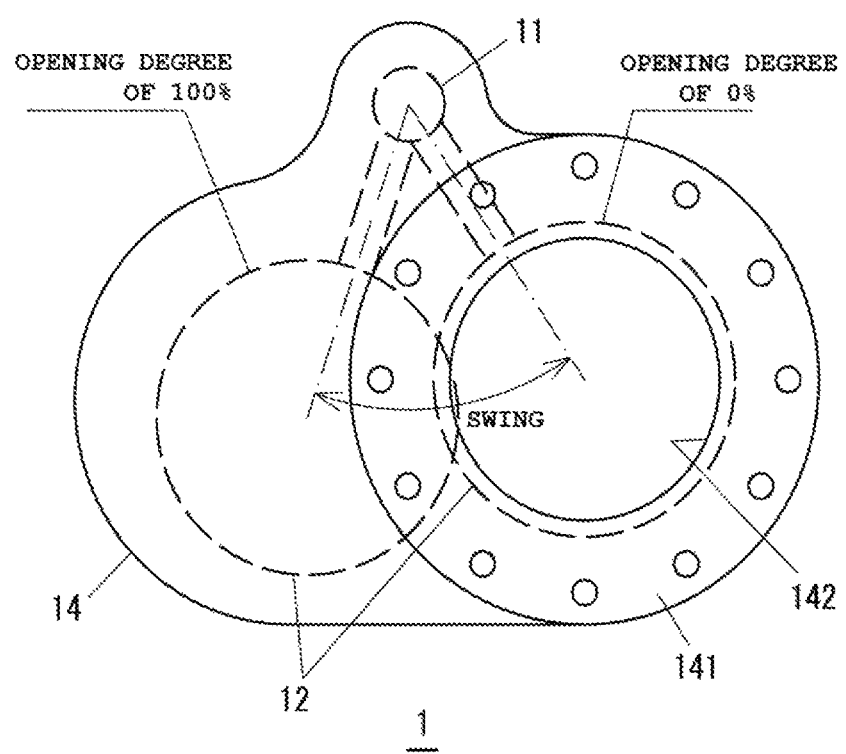
FIG. 2 is a view of a suction port side of the pressure adjustment vacuum valve.

FIG. 2 is a view of a suction port side of the pressure adjustment vacuum valve 1. The valve element 12 is housed in a valve body 14 of the pressure adjustment vacuum valve 1, and a suction port flange 141 having an opening 142 is provided on a suction side of the valve body 14. Note that on an exhaust side (the opposite side of the suction side) of the valve body 14, an exhaust port flange (not shown) attached to the vacuum pump 4 is provided coaxially with the suction port flange 141.

When the motor 11 is rotatably driven in a forward direction and a reverse direction to swingably drive the valve element 12, the valve element 12 slides in the horizontal direction to perform valve opening/closing operation. The valve element 12 is openably driven between a position at which the valve element 12 faces the entirety of the opening 142 and an opening degree is 0% and a position at which the valve element 12 is retracted from the opening 142 and the opening degree is 100%. In the pressure adjustment vacuum valve 1, the opening degree of the valve element 12 is adjusted so that the conductance of the pressure adjustment vacuum valve 1 can be adjusted.

Figure 3:
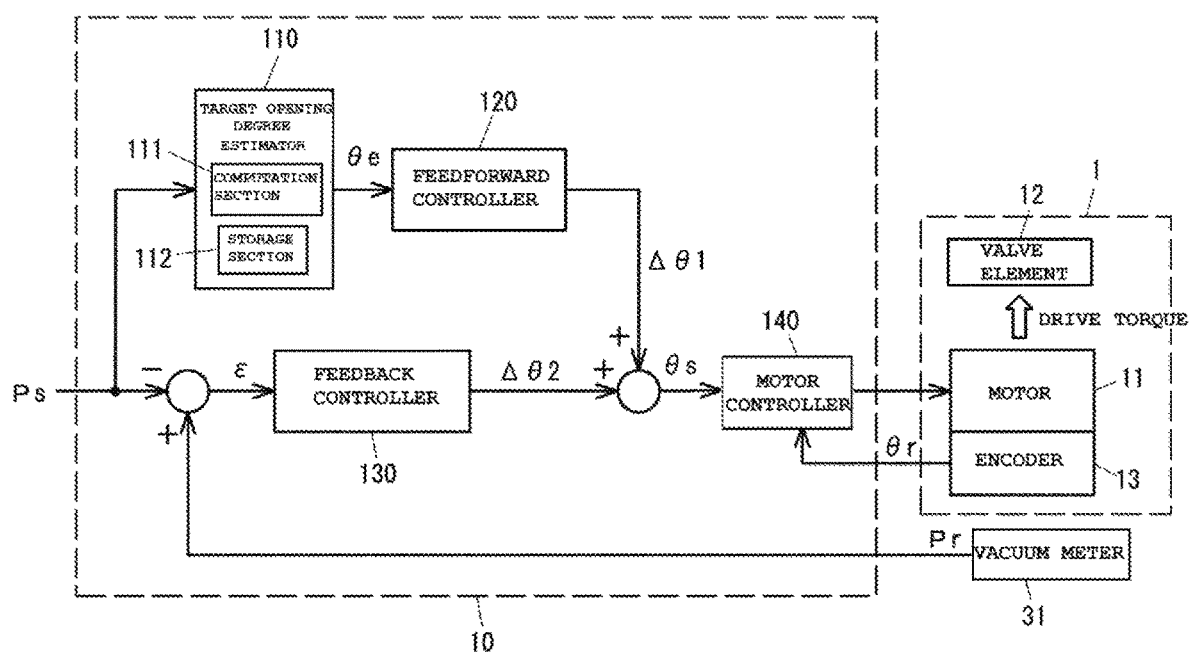
FIG. 3 is a block diagram for describing pressure adjustment control of the pressure adjustment vacuum valve.

FIG. 3 is a block diagram for describing pressure adjustment control of the pressure adjustment vacuum valve 1. The motor 11 includes an encoder 13 configured to detect the opening degree of the valve element 12. A detection signal of the encoder 13 (hereinafter referred to as an "opening degree measurement value Or") is input to the valve control section 10. Moreover, the pressure measurement value Pr of the vacuum meter 31 is input to the valve control section 10. The valve control section 10 includes a target opening degree estimator 110, a feedforward controller 120, a feedback controller 130, and a motor controller 140.

The target opening degree estimator 110 is configured to estimate and compute a target opening degree estimation value θe based on the input target pressure value Ps. A correlation between an opening degree θ and a pressure P is stored in a storage section 112 of the target opening degree estimator 110, and a computation section 111 is configured to estimate and compute the target opening degree estimation value θe based on the target pressure value Ps and the correlation. The method for estimating and computing the target opening degree estimation value θe will be described later. The feedforward controller 120 is configured to output an opening degree setting output (a feedforward opening degree setting output) Δθ1 based on the target opening degree estimation value θe estimated and computed by the target opening degree estimator 110. As described above, in feedforward control, the target opening degree estimation value θe corresponding to the target pressure value Ps is separately obtained, and an opening degree setting is output in a path properly determined such that the opening degree eventually reaches the target opening degree estimation value θe. The feedback controller 130 is configured to output an opening degree setting output (a feedback opening degree setting output) Δθ2 based on a deviation ε. Normally, the feedback controller 130 includes a proportional gain and an integral gain (a so-called PI gain).

The feedforward opening degree setting output Δθ1 and the feedback opening degree setting output Δθ2 are added up, and as an opening degree setting output θs, are input to the motor controller 140. The motor controller 140 is configured to control driving of the motor 11 based on the opening degree setting output θs. In the block diagram illustrated in FIG. 3, the opening degree setting output θs obtained by summation of the feedforward opening degree setting output Δθ1 and the feedback opening degree setting output Δθ2 is input to the motor controller 140. In an actual control pattern, feedback control may be combined from the start of driving of the valve element, i.e., control may be performed with the opening degree setting output θs to which a Δθ2 value as a non-zero value is added. Alternatively, there may be a control pattern in which driving is performed by the feedforward control at a preceding period of driving and the feedback control is performed at a latter period of driving when Δθ1 reaches θe and the pressure becomes close to the target pressure value. At the start of pressure adjustment when the pressure is far from the target pressure value, the feedforward control is dominant. When the pressure is close to the target pressure value, the feedback control is dominant. Hereinafter, the case of the latter control pattern will be described by way of example.

(Plant Gain Gp)

As described above, in the computation section 111 of the target opening degree estimator 110, the target opening degree estimation value θe is estimated and computed based on the correlation between the opening degree θ and the pressure P of the vacuum chamber 3 in the storage section 112 and the input target pressure value Ps. A case where a plant gain Gp defined by Expression (1) below is used as the correlation between the opening degree θ and the pressure P will be described herein by way of example. As seen from Expression (1), the plant gain Gp represents pressure response characteristics in association with a change in the opening degree θ. Note that $|(\Delta P/\Delta \theta)|$ indicates an absolute value of $(\Delta P/\Delta \theta)$.

$$Gp = |(\Delta P/\Delta \theta)|/P \quad (1)$$

In a case where the opening degree θ is taken as an input and the pressure P of the vacuum chamber 3 is taken as an output, a pressure change in association with an opening degree change, i.e., an amount $((\Delta P/\Delta \theta)/P)$ obtained by normalization of $(\Delta P/\Delta \theta)$ with respect to the pressure P, represents static gain characteristics of pressure response of lean gas in the vacuum chamber 3 as a plant. The absolute value $|(\Delta P/\Delta \theta)|/P$ of $(\Delta P/\Delta \theta)/P$ is herein referred to as the "plant gain Gp." Note that the plant gain Gp represented by Expression (1) can be assumed as an amount obtained by differentiation of the logarithmic value $(\text{Log}_e P(\theta))$ of the pressure P(θ) with respect to the opening degree θ.

The plant gain Gp is a characteristic of a system including the pressure adjustment vacuum valve 1, the vacuum chamber 3, and the vacuum pump 4. Even when the same pressure adjustment vacuum valve 1 is employed, if the vacuum chamber 3 or the vacuum pump 4 varies, the plant gain Gp slightly varies.

Typically, for opening degree control of the pressure adjustment vacuum valve 1, an effective pumping speed value Se at a suction port of the pressure adjustment vacuum valve 1 is generally used. Normally, when the pressure adjustment vacuum valve 1 is used with the pressure adjustment vacuum valve 1 being attached to the vacuum chamber 3, initial correction operation for the effective pumping speed value Se, i.e., initial correction operation for valve element control, is performed. Generally, under representative or average gas conditions (a gas type, a gas flow rate) of applied process conditions, the gain of the controller is corrected according to, e.g., the volume of the vacuum chamber 3 and sensitivity of the valve element. For example, in many cases, the average molecular weight of a gas mixture is obtained as the average condition, and a gas type of which handling is relatively easy is used as a substitute.

A default value (a data table) of the plant gain Gp is stored in the storage section 112. For the plant gain Gp, initial correction is necessary as in the typical case where control is performed using the effective pumping speed value Se. By initial correction, a plant gain Gpi for each opening degree θi under predetermined particular conditions for the gas type and the flow rate value is obtained, and the resultant data table (θi, Gpi) is stored as the corrected plant gain Gp in the storage section 112.

Figure 4:
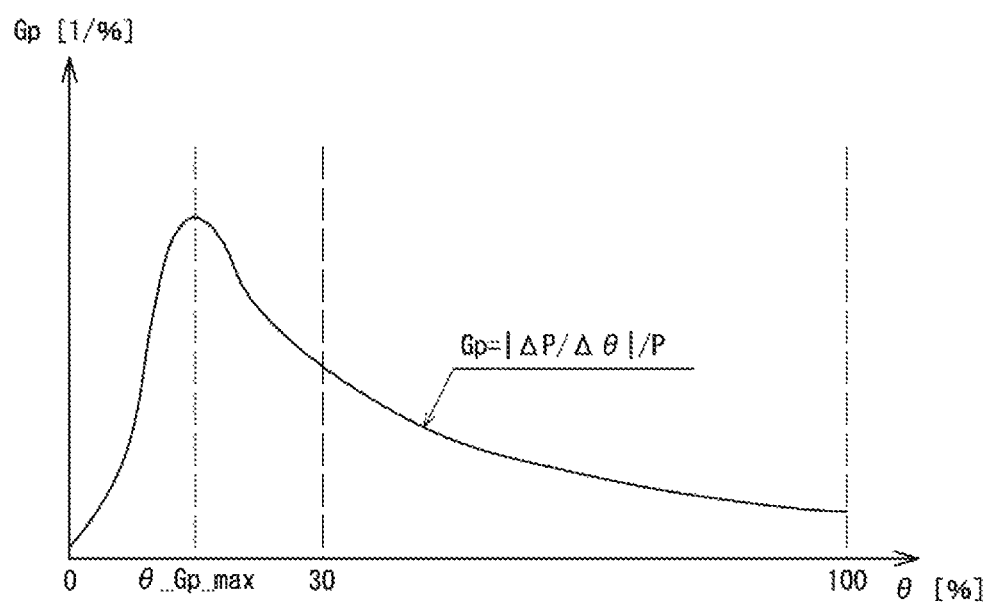
FIG. 4 is a graph of a plant gain characteristic curve.

FIG. 4 shows one example of a characteristic curve of the plant gain Gp. The plant gain Gp has the maximum value at an opening degree position (an opening degree θ_Gp_max) with a relatively-low opening degree θ. This shows that a pressure change greatly and sensitively responds to an opening degree change in the vicinity of the opening degree θ_Gp_max with the maximum value and is insensitive to an opening degree change in the vicinity of the foot of the curve with a small value of the plant gain Gp (a range with a high opening degree θ).

Figure 5:
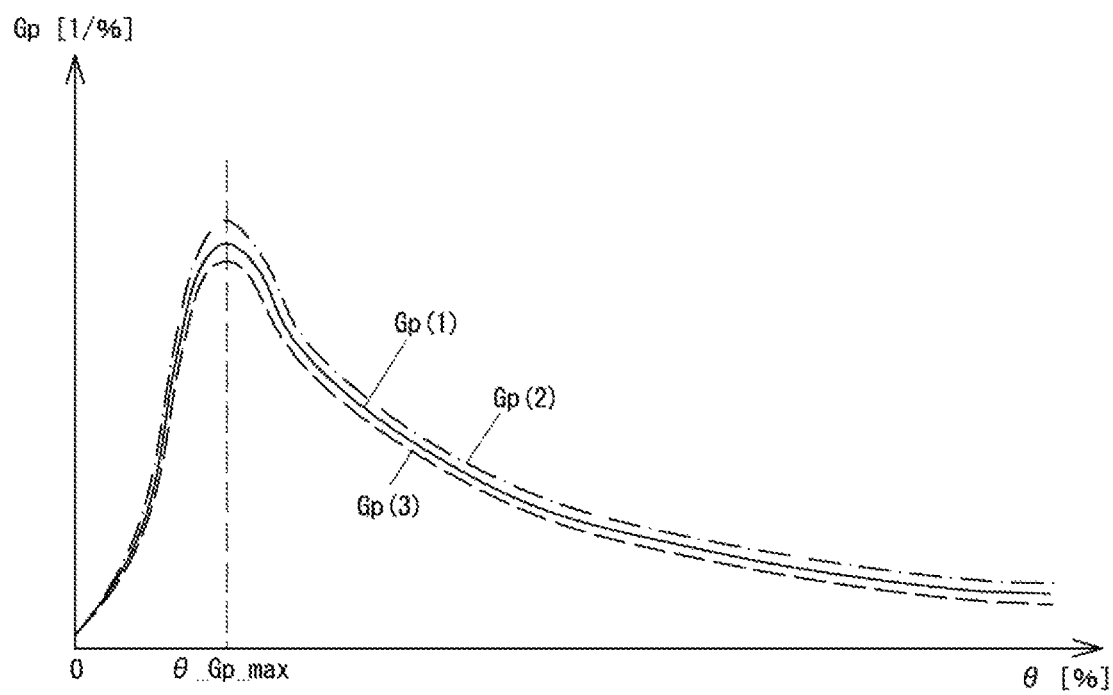
FIG. 5 is a graph of a plant gain for different gas types.

The inventor(s) has found that the plant gain Gp defined as in Expression (1) has, as illustrated in FIG. 5, the maximum value at the substantially same position of the opening degree θ_Gp_max as in curves Gp(1), Gp(2), Gp(3) even when the type of gas to be discharged varies. Moreover, the value of the plant gain Gp exhibits such characteristics that the plant gain Gp is, including the opening degree around the opening degree θ_Gp_max, within a range of several tens of percent even when the gas type and the injected gas flow rate vary. On the other hand, the effective pumping speed value Se exhibits such characteristics that the effective pumping speed value Se varies within a range of about several hundreds of percent due to a difference in the gas type and the injected gas flow rate.

(Calculation of Target Opening Degree Estimation Value θe)

Next, one example of the method for calculating the target opening degree estimation value θe by means of the plant gain Gp will be described, supposing that a current pressure adjustment state (θ, P) is (θ0, P0) and a subsequent pressure adjustment state to which the current pressure adjustment state needs to transition is (θ1, P1). Any of these pressure adjustment states is an equilibrium state, and therefore, is according to a plant gain Gp(θ) corresponding to the gas type/flow rate in pressure adjustment. Further, the plant gain Gp exhibits low dependency on the gas type and the flow rate as described above, and therefore, it may be assumed that the plant gain Gp can be substantially approximated to the data on the plant gain Gp for the predetermined gas type/flow rate stored in advance in the storage section 112 or the corrected data.

Using a data table (θ, Gp) showing a relationship between the opening degree θ and the plant gain Gp in FIG. 4, the plant gain Gp(θ) for each opening degree θ is obtained. Using a definitional equation of Expression (1), a relationship between an opening degree change Δθ and a pressure change ΔP is represented as in Expression (2) below. When the opening degree θ increases, the pressure P decreases. Thus, a negative sign is assigned to the right side of Expression 2).

$$\Delta P = -P \times Gp(\theta) \times \Delta\theta \quad (2)$$

A relationship between the current pressure adjustment state (θ0, P0) and the subsequent pressure adjustment state (θ1, P1) is represented by Expressions (3) and (4).

$$\theta 1 = \theta 0 + \int d\theta \text{ (an integral range of } \theta 0 \text{ to } \theta 1) \quad (3)$$

$$P1 = P0 + \int dP \text{ (an integral range of } P0 \text{ to } P1) \quad (4)$$

The integrals of Expressions (3) and (4) are actually represented as values obtained in such a manner that an opening degree increment Δθ and a pressure increment ΔP in each quasi-static state from the pressure adjustment state (θ0, P0) to the pressure adjustment state (θ1, P1) are added, and therefore, θ1 and P1 may be represented as in Expressions (5) and (6) below. Note that Δθ_n(θ_n) in Expression (5) indicates an opening degree increment Δθ_n at an opening degree θ_n, and for example, Δθ_1(θ_1) is an opening degree increment in the case of a change from the opening degree θ0 to the opening degree θ_1. Similarly, ΔP_n(p_n) represents a pressure increment at a pressure p_n.

$$\theta 1 = \theta 0 + \Sigma \Delta\theta\_n(\theta\_n) \quad (5)$$

$$P1 = P0 + \Sigma \Delta P\_n(P\_n) \quad (6)$$

Regarding Δθ_n(θ_n) of Expression (5), the increment Δθ_n(θ_n) may be provided according to each opening degree θ_n as in Expression (7). Regarding ΔP_n(P_n) of Expression (6), the increment ΔP_n(P_n) at the pressure P_n in association with the increment Δθ_n(θ_n) at the opening degree θ_n may be provided using the correlation between the opening degree θ and the pressure P. In the case of using the plant gain Gp as the correlation, the increment ΔP_n=ΔP_n(P_n) at the pressure P_n is represented as in Expression (8) below by application of Expression (2) above. Note that in Expression (8), Δθ_n=Δθ_n(θ_n) and Gp_n=Gp(θ_n) are satisfied.

$$\Delta\theta\_n = \Delta\theta\_n(\theta\_n) \quad (7)$$

$$\Delta P\_n = \Delta P\_n(P\_n) = -P\_n \times Gp\_n \times \Delta\theta\_n \quad (8)$$

When Expression (7), (8) is substituted into Expression (5), (6) and cumulative computation is performed, the opening degree and the pressure can substantially reach the opening degree value θ1 and the pressure value P1 in the pressure adjustment state (θ1, P1). Moreover, when Expressions (5) and (6) are deformed into those shown below, computation can be sequentially performed.

$$\theta\_n+1 = \theta\_n + \Delta\theta\_n \quad (9)$$

$$P\_n+1 = P\_n + \Delta P\_n \quad (10)$$

In the current pressure adjustment state (θ0, P0), when the target pressure value Ps is, as a subsequent pressure adjustment condition, input from the device controller 2 to the valve control section 10, it is, at this point, determined that a subsequent target pressure is higher or lower than at least a current target pressure. Thus, in a case where the subsequent target pressure value Ps is higher (Ps=P1>P0), a valve element drive direction is the direction of decreasing the opening degree as compared to a current opening degree as long as the flow rate does not extremely change. Conversely, in a case where the subsequent target pressure value Ps is lower (Ps=P1<P0), the valve element drive direction is the direction of increasing the opening degree as compared to the current opening degree. That is, when the subsequent pressure control condition is instructed by the device controller 2, the direction of monotonically increasing the opening degree from the current pressure adjustment state (θ0, P0) by the opening degree increment or the direction of monotonically decreasing the opening degree from the current pressure adjustment state (θ0, P0) by the opening degree increment can be determined.

When a computation processing capacity of the target opening degree estimator 110 is high, the value of Δθ_n in Expression (7) is set as small as possible so that computation accuracy can be enhanced. For example, Δθ_n is set to equal to or lower than 0.1% with respect to a full opening degree of 100%. The opening degree θ is cumulatively computed from Expressions (7) and (9), supposing that the opening degree is monotonically increased or decreased by 0.1% from the pressure adjustment state (θ0, P0). The pressure P is sequentially cumulatively computed from Expressions (8) and (10). Then, when the value "P0+ΣΔP_n(P_n)" of the right side of Expression (6) as a cumulatively-computed value of the pressure reaches a subsequent pressure value (the target pressure value) P1 (or exceeds the subsequent pressure value P1), computation ends. The opening degree cumulatively computed when the pressure reaches the pressure value P1 corresponds to the target opening degree estimation value θe. One example of the method for calculating the target opening degree estimation value θe has been described above. However, the plant gain is also the amount obtained by differentiation of the logarithmic value of the pressure with respect to the opening degree as described above. Thus, although not described in detail, the target opening degree estimation value θe can be also obtained by logarithmic computation or exponential computation.

(Comparison Examples)

As described above, in the present embodiment, the target opening degree estimation value θe corresponding to the target pressure value Ps is estimated in the target opening degree estimator 110, and the feedforward opening degree setting output Δθ1 is output based on the target opening degree estimation value θe. In the pressure adjustment vacuum valve of this type, the opening degree is controlled using the effective pumping speed value Se at the valve suction port as described above. In initial correction, the predetermined flow rate Qin of gas is injected into the vacuum chamber 3, and the volume V of the vacuum chamber 3 is obtained from pressure change information at this point by a buildup method. Moreover, a chamber pressure Pri is measured for each valve element opening degree θi in the equilibrium state, and an effective pumping speed value Sei(θi) at each opening degree θi is calculated according to Sei=Qin/Pri. Data (θi, Sei) at this point is stored as a data table of the corrected effective pumping speed value Se.

Thus, when each value on the right side is accurately obtained, the injected gas flow rate Qin can be estimated using an exhaust expression "Qin=V×(dPr/dt)+Se×Pr." Pr is the pressure measurement value of the vacuum chamber 3 measured by the vacuum meter 31. Moreover, dPr/dt is a pressure differential value, and is obtained from a difference between a current pressure measurement value and a previous pressure measurement value. Se is obtained from the data table (θi, Sei) obtained by correction and the opening degree measurement value θr output from the encoder 13 (see FIG. 3). Using these values, Qin on the left side is calculated. Thus, if the estimated flow rate value is constant without an increase/decrease in the estimated flow rate value, an effective pumping speed value Se_s when the pressure reaches the target pressure value Ps can be obtained according to an expression "Se_s=Qin/Ps." Further, from the calculated effective pumping speed value Se_s and the data table (θi, Sei), the target opening degree estimation value θe corresponding to the effective pumping speed value Se_s can be obtained.

In a case where there is an error in the data table (θi, Sei) of the effective pumping speed value Se_s, such as a case where a gas type used upon correction and a gas type used in an actual process are different from each other, Qin obtained according to the exhaust expression by application of the data table (θi, Sei) has an error. As described above, in the case of the plant gain Gp representing the relationship between a change in the opening degree θ and a change in the pressure P, variation is within a range of several tens of percent even when the gas type or the injected gas flow rate varies. However, in the case of the effective pumping speed value Se, the characteristics with variation within a range of about several hundreds of percent are exhibited.

The first item "V×(dPr/dt)" on the right side of the exhaust expression is such a dynamic item that an absolute value is great in the case of great pressure fluctuation, and the second item "Se×Pr" is a static item. For example, in a case where the target pressure value Ps is lower than the current pressure measurement value Pr, i.e., the case of (dPr/dt)<0, if the effective pumping speed value Se to be used is smaller than an actual effective pumping speed value, the second item "Se×Pr" is smaller than an actual value, and a negative value of the right side is obtained. As described above, obviously-inaccurate estimation such as a negative injected gas flow rate Qin might be made.

Figure 6:
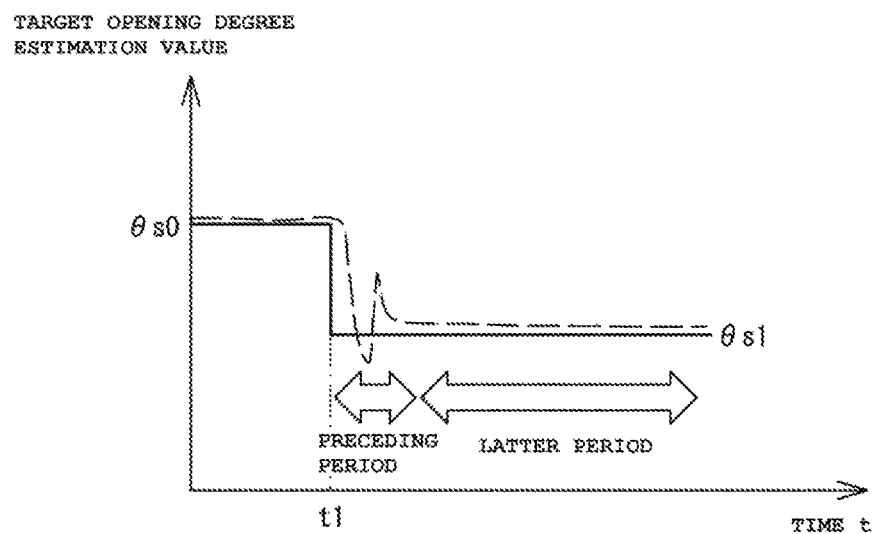
FIG. 6 illustrates one example of a target opening degree estimation value θe in a case where there is an error in an effective pumping speed value Se.

Such computation of the target opening degree estimation value θe is repeated even after the start of driving of the valve element, and an opening degree setting based on such computation is output. FIG. 6 illustrates one example of the target opening degree estimation value θe in a case where there is an error in the effective pumping speed value Se. The target pressure value is Ps0 before a time point t1, and a target opening degree estimation value θe0 corresponding to the target pressure value Ps0 is calculated. When a target pressure value Ps1 is input at the time point t1, computation of a target opening degree estimation value θe1 corresponding to the target pressure value Ps1 is started from this point based on the exhaust expression and effective pumping speed value data. A step-shaped line indicated by a solid line indicates a target opening degree θs0, θs1 corresponding to the target pressure value Ps0, Ps1, and ideally, a computation result of the target opening degree estimation value also preferably shows such a line. However, the computation result of the target opening degree estimation value ee actually shows a line indicated by a dashed line, and deviates from the ideal line.

Generally, in a case where pressure fluctuation is great at a preceding period of the pressure adjustment control and there is an error in the effective pumping speed value Se as described above, the accuracy of target opening degree estimation is lowered, and a feedforward control output value deviating from an opening degree value which needs to be actually set is set. For this reason, in some cases, an opening amount to be corrected in the feedback control is increased, and an overshoot phenomenon in which pressure response extremely exceeds the target pressure value occurs. As a result, there is a problem in opening degree control stability.

On the other hand, in the present embodiment, the target opening degree estimation value θe corresponding to the target pressure value Ps is, regardless of the start of driving of the valve element, estimated based on the opening degree θ0 and the pressure P0 in the current pressure adjustment state (θ0, P0) and the correlation between the opening degree θ of the valve element 12 of the pressure adjustment vacuum valve 1 and the pressure (i.e., the valve suction port pressure) P of the vacuum chamber 3. Thus, the target opening degree estimation value θe can be more accurately calculated as compared to the typical case as described above. As a result, a burden on the feedback control at a latter period of the control can be reduced, and pressure adjustment response performance can be improved.

Various correlations between the opening degree and the pressure are conceivable. Using the plant gain Gp as one correlation indicating the pressure response characteristics in association with an opening degree change, variation in the plant gain Gp can be suppressed to equal to or lower than several tens of percent even when the gas conditions vary. Thus, influence on the valve element control due to a difference among the gas conditions upon plant gain correction and the gas conditions upon the process can be reduced as compared to that in the typical case, leading to excellent control stability. Moreover, even in the case of use for a process under various gas conditions, such a case can be sufficiently handled by correction of the plant gain Gp under the average gas conditions.

In the case of the method for obtaining the target opening degree estimation value θe from the exhaust expression and the data table (θi, Sei) of the effective pumping speed value Se as described above, even if the method is applied in a state in which a pressure increase/decrease is gradual with a relatively-reduced error, the effective pumping speed value Se exhibits such characteristics that the effective pumping speed value Se varies within a range of about several hundreds of percent. Thus, a data table for the type of gas to be actually supplied and an actual injected gas flow rate needs to be used.

Further, in the case of the method for obtaining the target opening degree estimation value θe from the exhaust expression and the effective pumping speed value Se, driving of the valve element 12 is started for estimation. In the case of the present embodiment, the target opening degree estimation value θe is calculated by cumulative computation as shown in Expressions (5) and (6), and therefore, can be obtained regardless of the start of driving of the valve element.

(Application to Pressure Adjustment Control)

As described above, when the subsequent pressure adjustment condition (the target pressure value P1) is instructed in the pressure adjustment state (θ0, P0), the target opening degree estimator 110 obtains, by computation, the target opening degree estimation value θe according to the above-described algorithm. Then, the feedforward controller 120 outputs the feedforward opening degree setting output Δθ1 for driving the valve element 12 from the current opening degree θ0 to the target opening degree estimation value θe at a predetermined opening speed. Moreover, the feedback controller 130 outputs Δθ2=0 as the feedback opening degree setting output Δθ2 until the feedforward opening degree eventually reaches θe in a predetermined path. When the feedforward opening degree reaches θe, the feedback opening degree setting output Δθ2 (≠0) corresponding to the deviation ε=Pr−Ps is output. Note that when the feedback control begins, the feedforward opening degree setting output Δθ1 is constant with respect to the θe value.

That is, the pressure adjustment control is performed by the feedforward control (θs=Δθ1) until the deviation ε reaches a relatively-small value. When the deviation ε reaches the relatively-small value as a result of the feedforward control, the pressure measurement value Pr converges to the target pressure value Ps by the feedback control (θs=θe+Δθ2) to correct and eliminate an error, which cannot be eliminated only by the feedforward control, in convergence to the target pressure. The motor controller 140 controls the motor 11 such that the valve element 12 is driven at a predetermined speed (e.g., the maximum speed allowing driving) based on the opening degree setting output θs.

There is a case where the feedforward opening degree setting output Δθ1 and the feedback opening degree setting output Δθ2 are combined and simultaneously controlled as illustrated in FIG. 3. In this case, for avoiding useless cancellation of the opening degree simultaneously output by the feedforward control, the target pressure value Ps of the current pressure measurement value Pr and the target pressure value Ps for the deviation ε in the feedback control is not set to a step shape from Ps0 at the start to subsequent Ps1, but preferably continuously changes from Ps0 to Ps1. There is an example where pressure response corresponding to an opening degree output locus in the feedforward control is used as a reasonable signal. Thus, in a case where the pressure response corresponding to the opening degree output locus in the feedforward control cannot be accurately predicted, the feedback control is, as described above, started after output in the feedforward control (i.e., after completion of output until the target opening degree estimation value θe) such that the pressure converges to the subsequent target pressure value Ps1.

(First Variation)

In description above, the case where the value of Δθ_n in Expression (7) is the minute amount (e.g., ±0.1%) as a fixed value has been described by way of example. However, as also seen from the curve characteristics of the plant gain Gp of FIG. 4, the amount of change in the Gp value is great in a range where the opening degree θ is low (lower than 30% as a rough indication), and a peak position at which the Gp value is maximum is also present in such a range. On the other hand, in a range where the opening degree θ is high (equal to or higher than 30% as a rough indication), the Gp value monotonically decreases. Moreover, the magnitude of the Gp value is smaller than that in the opening degree range where the opening degree is lower than 30%, and the amount of change in the Gp value in association with a change in the opening degree θ is smaller.

Thus, for example, in the case of an opening degree of equal to or higher than 30% in FIG. 4, Δθ_n is preferably increased for roughening computation. In the case of an opening degree of lower than 30%, Δθ_n is preferably decreased according to the computation processing capacity for increasing the computation accuracy.

In the case of exhaust from the chamber with the volume V at the effective pumping speed value Se, the internal pressure P of the chamber changes substantially proportional to exp (−t/α). In this case, α is an amount provided by α=V/Se, and is a time constant as a rough indication of a pressure response speed. Separately from the plant gain Gp, the data table (θi, Sei) showing the correlation between the effective pumping speed value Se and the opening degree θ may be stored in advance, and an effective pumping speed value Se_n corresponding to each opening degree θ_n calculated in computation of the target opening degree estimation value may be obtained. Then, the time constant α may be calculated for each effective pumping speed value Se_n, and the opening degree output locus in the feedforward control may be determined corresponding to each time constant α. That is, the gradient of the opening degree output is set smaller (i.e., a valve element driving speed is set lower) for the opening degree θ_n with a longer time constant α, and is set greater (i.e., the valve element driving speed is set higher) for the opening degree θ_n with a shorter time constant α.

(Second Variation)

In a state in which the feedforward control is applied, the current pressure measurement value Pr relatively deviates from the target pressure value Ps. Thus, in terms of obtaining quick response, the opening degree output (θs0 at the start to θs1 at the end) by the feedforward control as described above is slightly increased, and in this manner, responsiveness can be improved. That is, the value of the final value θs1 is increased to θs1'. For example, a calculational target pressure is set and calculated such that the attained pressure is higher than the target pressure value Ps1 at the end by about 10%. Specifically, in the case of Ps1<Ps0, the left side P1 of Expression (6) is set to 0.9×Ps1, and then, the opening degree is calculated. In the case of Ps1>Ps0, the left side P1 of Expression (6) is set to 1.1×Ps1, and then, the opening degree is calculated. Such a calculation result θs1' is θs1'>θs1 in the case of Ps1<Ps0, and is θs1'<θs1 in the case of Ps1>Ps0. The output is actually increased (decreased) for correction. Further, in an application example, the opening degree output (in the order of θs0 at the start, θs1' in the middle, and θs1 at the end) may be made by the feedforward control such that the opening degree eventually reaches a non-increased (non-decreased) opening degree by way of an increased (decreased) opening degree. Note that an increase (decrease) degree needs to be determined considering a response capacity in the feedback control. The rate of increase is lower in the case of a lower response capacity, and is higher in the case of a higher response capacity.

The present invention is not limited to the contents of the above-described embodiment and the variations, and other aspects conceivable within the scope of the technical idea of the present invention are also included in the scope of the present invention. For example, in the above-described embodiment, the target opening degree estimator 110 is provided at the valve control section 10 of the pressure adjustment vacuum valve 1, but may be a target opening degree estimator independently of the pressure adjustment vacuum valve 1. Alternatively, the target opening degree estimator 110 may be provided at the device controller 2. Moreover, the valve element 12 as the vacuum value is slidably moved to change the opening degree, but the present invention is applicable to a vacuum valve type configured to change an opening degree to control a conductance.

What is claimed is:

1. A target opening degree estimator comprising a controller configured to estimate a target opening degree estimation value as an opening degree of a valve element of a pressure adjustment vacuum valve when a pressure of a vacuum chamber connected to the pressure adjustment vacuum valve reaches a pressure adjustment target pressure based on a correlation between the opening degree of the valve element and the pressure of the vacuum chamber, a current opening degree, and a current pressure, wherein the correlation is a correlation showing a pressure response characteristic in association with an opening degree change, and the correlation is an amount represented by an expression of $|(\Delta P/\Delta\theta)|/P$ where the pressure of the vacuum chamber is P, a change in the pressure of the vacuum chamber is $\Delta P$, and a change in the opening degree of the valve element is $\Delta\theta$.

2. The target opening degree estimator according to claim 1, wherein the target opening degree estimation value is estimated in such a manner that addition of an opening degree increment is repeated until a pressure calculated based on a post-addition opening degree obtained by addition of the opening degree increment to the current opening degree and the correlation reaches equal to or higher than the pressure adjustment target pressure, and a first opening degree increment is used as the opening degree increment in a case where a pre-addition opening degree is lower than a predetermined opening degree, and a second opening degree increment greater than the first opening degree increment is used as the opening degree increment in a case where the pre-addition opening degree is equal to or higher than the predetermined opening degree.

3. A pressure adjustment vacuum valve comprising:

a valve element to be openably driven;

the target opening degree estimator according to claim 1; and an opening degree controller configured to control the opening degree of the valve element based on a target opening degree estimation value estimated by the target opening degree estimator.

4. The pressure adjustment vacuum valve according to claim 3, wherein the opening degree controller outputs, from start of pressure adjustment by valve element driving, a feedforward opening degree from the current opening degree to the target opening degree estimation value, thereby performing feedforward control for the opening degree of the valve element.

5. The pressure adjustment vacuum valve according to claim 4, wherein the opening degree controller performs feedback control in addition to the feedforward control, and in the feedback control, a feedback opening degree with a value of zero is output until the feedforward opening degree reaches the target opening degree estimation value, and when the feedforward opening degree reaches the target opening degree estimation value, a feedback opening degree corresponding to a deviation of the pressure of the vacuum chamber with respect to the pressure adjustment target pressure is output.

6. The pressure adjustment vacuum valve according to claim 4, wherein the opening degree controller outputs a feedforward opening degree from the current opening degree to an opening degree higher than the target opening degree estimation value in a case where the pressure adjustment target pressure is lower than the pressure of the vacuum chamber, and outputs a feedforward opening degree from the current opening degree to an opening degree lower than the target opening degree estimation value in a case where the pressure adjustment target pressure is higher than the pressure of the vacuum chamber.

* * * * *